Feb. 14, 1950 T. MORENO 2,497,094
MICROWAVE APPARATUS
Filed Feb. 28, 1945 2 Sheets-Sheet 1
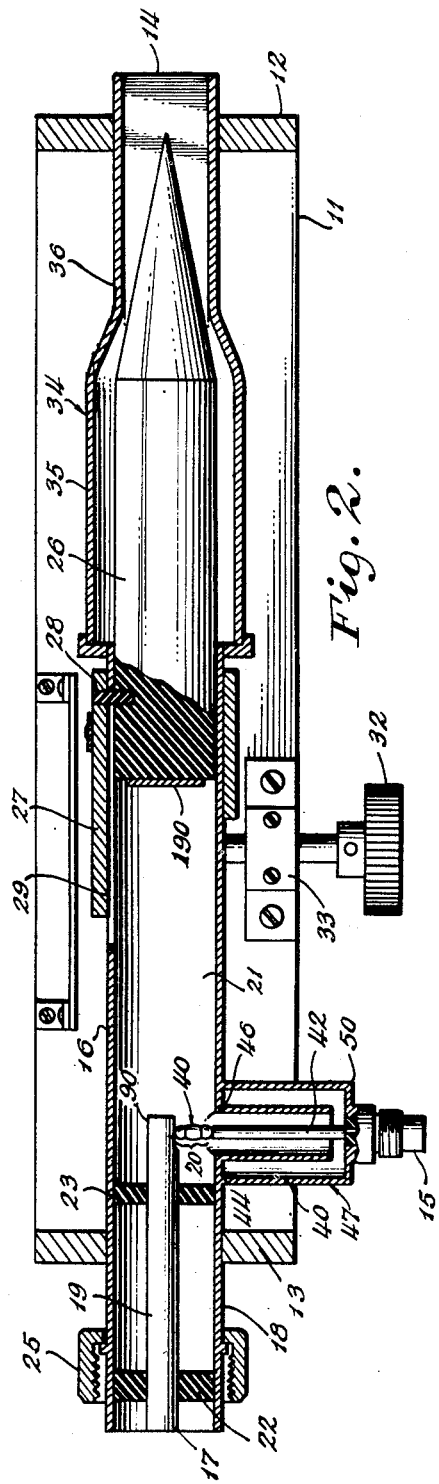
INVENTOR
THEODORE MORENO
BY Paul B. Hunter
ATTORNEY Feb. 14, 1950     T. MORENO     2,497,094
MICROWAVE APPARATUS
Filed Feb. 28, 1945     2 Sheets—Sheet 2

INVENTOR
THEODORE MORENO
BY
Paul B. Hunter
ATTORNEY

Patented Feb. 14, 1950

2,497,094

UNITED STATES PATENT OFFICE 2,497,094

MICROWAVE APPARATUS

Theodore Moreno, Garden City, N. Y., assignor to The Sperry Corporation, a corporation of Delaware Application February 28, 1945, Serial No. 580,220

3 Claims. (Cl. 171—95)

This invention relates generally to electrical measuring instruments and, more particularly, to devices including power monitors for microwaves of wavelengths below one meter, such as are used with microwave attenuators or other apparatus.

The monitor described herein may be utilized with an associated wave guide dimensioned either above or below cut-off, or other apparatus to which high frequency energy is coupled. However, in its preferred form the monitor is particularly suited to be used with wave guide attenuators dimensioned below cut-off and will hereinafter be discussed with reference to the latter type.

The operation of a below cut-off wave guide attenuator may be essentially described as follows: If a possible mode of propagation is excited in a wave guide that is below cut-off for that particular mode, there will be no real propagation of energy down the wave guide. The input impedance will be a pure reactance, if losses in the walls of the wave guide are neglected, with the fields that are excited in the wave guide diminishing exponentially with distance from the point of excitation.

The attenuation is given by $$\alpha = 8.69 \sqrt{\left(\frac{2\pi}{\lambda_c}\right)^2 - \left(\frac{2\pi}{\lambda}\right)^2} \frac{db}{\text{unit length}}$$

wherein $\lambda$ is the free space wavelength and $\lambda_c$ the wavelength at cut-off.

Ideally, this were so. Practically, however, a probe inserted into such a wave guide at some distance from the point of excitation will abstract power. The amount of energy thus abstracted from the guide is proportional to the square of the field strength at the point of pick-up, and since this field strength diminishes exponentially with distance from the point of excitation, a wave guide below cut-off can be readily used as a variable attenuator whose attenuation in decibels is substantially a linear function of distance over a considerable range.

It is, of course, advisable and highly desirable that some means for monitoring the power input to such an attenuator be provided. To do this is no easy task and becomes a serious problem, especially, when it is desired to make the monitor independent of input frequencies which vary over a considerable range or band width.

Present known practices for obtaining such power measurements are unsatisfactory. In one such attempt, a monitoring device consisting of a loop feeding a pick-up device (e. g. crystal) is placed at a point in the coaxial line feeding the attenuator.

This device, however, is sensitive to standing waves in the line and has the added disadvantage of being frequency sensitive. Both these disadvantages can be reduced somewhat by the intelligent design of a coupling unit and pick-up device, but can never completely be eliminated or corrected.

Attempts to do this have resulted in another device, commonly known as a directional coupler, which has the advantage of not being affected by reflected waves, but which is structurally complicated and whose accuracy is still dependent upon the impedance match between the input and the wave guide.

The disadvantages of all previous monitoring devices for use with wave guide attenuators accrue from the fact that it is neccesary to match the impedances of the wave guide input and the wave guide attenuator, since, if a mismatch occurs between the input and the wave guide, an error will be set up in the monitor indication. Since at ultra high frequencies, nothing is matched perfectly over an appreciable band of frequencies, these monitors are always apt to be in error.

These disadvantages are substantially overcome in the present novel device by incorporating the monitor directly in the circuit which excites the attenuator wave guide or, where used in other apparatus apart from attenuators, directly in the exciting circuit for such other apparatus. The monitor reading then depends solely and directly upon the excitation current and there is, therefore, no need to match the monitor input. This novel microwave monitor, moreover, will operate very efficiently at one frequency and, in addition, has the great advantage of being operative over a band of frequencies precluded to the ordinary monitoring device.

The excitation of the attenuator wave guide or other apparatus is measured by determining the amount of excitation current present at the point of excitation as a function of the resistivity of a resistance element incorporated within the monitoring circuit at the point of excitation and having a resistance varying with the excitation current. In its preferred form, the wave guide attenuator is coupled to the exciting element by means of an inductive loop conductor and the aforesaid variable resistive element is incorporated within the loop. This variable resistive element may take on a number of forms: viz. a heated wire element, a carbon or tungsten filament, a resistive bead, a lamp, a Wollaston wire, or other suitable means.

An object of this invention is, therefore, to provide a broad band monitoring device for use with microwave wave guides or other microwave apparatus.

Another object is to provide an improved method and apparatus for measuring power at frequencies in the microwave region.

A further object of the invention is to provide a monitor utilized in microwave wave guide attenuators which is frequency insensitive over a broad band of frequencies.

Another object is to provide an improved ultra high frequency current monitor device for measuring the excitation of a below cut-off wave guide attentuator or other apparatus.

An additional object is to provide an impedance-variable element in the input loop exciting a wave guide or other apparatus suitable for measurement of the excitation of the wave guide or apparatus.

Another object is to provide an improved apparatus for monitoring the excitation current of a wave guide attenuator.

A still further object is to provide means for continuously monitoring the input excitation of a wave guide attenuator.

A further object of this invention is to provide a monitoring device which is capable of continuously reading the excitation current of a below cut-off wave guide attenuator for varying frequency input.

Another object is to provide a monitoring device, whose accuracy is independent of the mismatch presented to an input transmission line by an input loop and its associated wave guide attenuator.

Another object is to provide means for reading the excitation current of a loop-excited wave guide.

Other and further objects and advantages will become apparent as the description proceeds.

In the drawings,

Fig. 1 shows a perspective view of the microwave monitor and its associated wave guide attenuator according to the present invention;

Fig. 2 shows a longitudinal horizontal cross-section of the microwave monitor and its associated attenuator as shown in Fig. 1;

Fig. 3 is a circuit diagram of a power measuring bridge connected to the monitor which is used as one arm thereof;

Like reference characters are utilized throughout the drawings to designate like parts.

Figure 4:
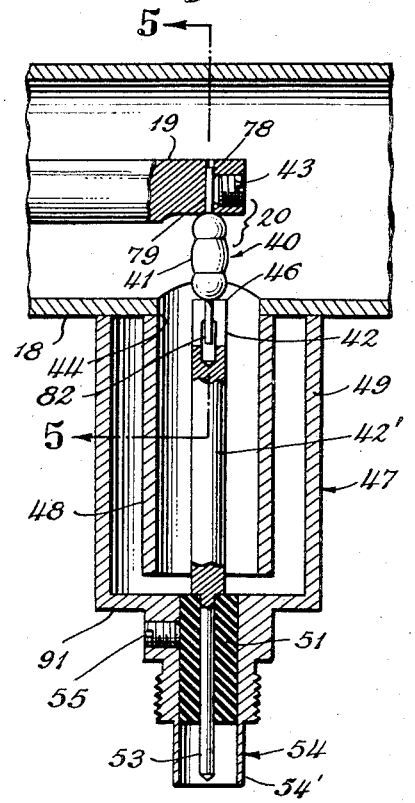
Fig. 4 is an enlarged view in longitudinal cross-section of a portion of the monitor shown in Fig. 2.

Referring to Figs. 1 and 2, the wave guide attenuator and monitor, according to the present invention, are supported on a stand 11 by means of posts 12 and 13 on which are clamped a wave guide 14 and monitor 15. Although, wave guide 14 is indicated as being rectangular in form, it is to be understood that this showing is purely illustrative and that other shapes and forms of wave guides, such as, circular, elliptical, and others, may be utilized. Preferably, the main body of the attenuator shown in the drawing is formed of a cylindrical section 16 whose diameter is so chosen that at the operating frequency of the device, cylinder 16 when acting as a wave guide would have dimensions below cut-off when filled solely with air.

Electromagnetic energy is fed to cylinder 16 of the attenuator through a coaxial line input 17 having an outer tubular conductor 18 and an inner conductor 19. The energy from the coaxial line is coupled to cylinder 16 by one end of inner conductor 19 of the coaxial line which is terminated in a radially extended portion or loop 20. It will be clear, therefore, that the energy fed into the cylinder will set up an electromagnetic field within the space 21 of cylinder 16 which is dimensioned below cut-off when acting as a wave guide. Accordingly, the energy from coaxial line 18—19 will set up a stationary electromagnetic field within cavity 21 by virtue of the excitation from loop 20, with said field decaying along cylinder 16 in accordance with well-known theory.

The inner conductor 19, of coaxial line 17, is supported at the left hand end of the coaxial line 17 by an insulating spacer or bushing 22 and on the right hand end by insulating spacer or bushing 23, said spacers being appropriately spaced from each other to avoid undesirable effects due to reflections therefrom.

For conducting microwave energy through coaxial line 17 from another transmission line (not shown) a conventional concentric line coupling 25 is provided in the left hand end of the line 17. It will be understood that such a coupling provides for making electrical connection to the outer conductor 18 and the inner conductor 19, from corresponding elements of the supply line (not shown).

In accordance with conventional practice, the other transmission line, referred to above, may be provided with an inductive loop coupling extending between the inner and outer conductors thereof for energy coupling with a suitable source of high frequency energy. It will be understood that the inner conductor 19 of transmission line 17, as well as the inner conductor of the other transmission line, may, if desired, be coaxially supported within the respective outer conductors by means of short-circuited quarter wavelength stub supports, as are well-known in the art.

As stated, section 21 of the wave guide serves as an attenuator; the amount of attenuation depending upon the length of this section. A plug 26 of dielectric material is inserted in cylinder 16 and its position within the cavity 21 is preferably made adjustable. Thus, plug 26 is fitted to a sleeve 27 sliding on the outside of cylinder 16 as by means of a pin 28, which freely passes through a slot 29 in cylinder 16.

In Fig. 1, sleeve 27 is shown as being rectangular in shape and supplied with a rack 30 fixed to the underside thereof. Rack 30 cooperates with a pinion 31, connected to an adjusting knob 32 journaled in a suitable bearing post 33. In this manner, rotation of knob 32 serves to displace dielectric plug 26 along cylinder 16.

Cylinder 16 acts as a wave guide below cut-off when such dielectric material is absent. However, with dielectric plug 26 in cylinder 16, a normal wave guide capable of propagating high frequency waves therealong is produced. Therefore, the adjustment of plug 26 serves to effectively adjust the length of the section of cylinder 16 which is acting as a wave guide below cut-off. Accordingly, the amount of high frequency energy fed through concentric line 17 which reaches plug 26 may be varied by means of a knob 32.

Coupled to cylinder 16 is a transition section 34 composed of a cylindrical portion 35 having a diameter suitable for the free propagation of ultra high frequency energy therealong with air dielectric and a section 36 which serves as a smooth transition between the rectangular wave guide 14 and cylindrical section 35. For purposes of convenience, the diameter of section 35 may be chosen to be the same as the maximum cross-sectional dimension of wave guide 14. Dielectric plug 26 is provided with a smoothly tapering section 37 which is preferably chosen of a length equivalent to several wavelengths at the operating frequency of the device. This portion of the device then acts to smoothly transfer the energy flowing within the portion of the dielectric plug 26 within cylinder 16 to the wave guide 14 through the transition section 34. Preferably, a terminating resistor 190 is placed on the left end of plug 26 so that the impedance of the attenuator, when viewed from the wave guide 14, will remain substantially constant and properly terminated at its characteristic impedance, independent of the setting of plug 26.

A scale 38 may be mounted on the base 11 to cooperate with a pointer 39' fixed to the adjustable sleeve 27, whereby the desired attenuation may be suitably selected.

Although cylinder 16 has been described as having a circular cross section, it is to be understood that this is so chosen for purposes of convenience only, and that any suitable cross section may be utilized, such as, rectangular, elliptical, etc. This may be done in the present instance merely by correspondingly changing the cross sections of plug 26 and sliding member 27. By making cylinder 16 a rectangular cross section, the necessity for a transition piece, such as 34, may be obviated.

In order to excite wave guide 21, an inductive loop 20 connecting inner conductor 19 of coaxial line 17 to the outer conductor 18 thereof, is provided. As shown more in detail in Figs. 4 and 5, the inductive loop 20 essentially comprises two conductive sections in series with each other: the first section being end terminus 90 of inner conductor 19 and the second section being a resistance element 39 of such character that its resistance changes upon increase of current flowing therethrough. A suitable element 39 may be formed as a well-known Wollaston wire (also termed a barretter). Element 39 extends radially from the inner conductor 19, and is connected, as will be shown, to conductor 18. Variation in current passing through the element 39 will change its resistance in accordance with the heat dissipation therein, and therefore in accordance with the amount of current flowing therethrough. This variation of the resistance of element 39, dependent upon the amount of current flowing through it, will provide an accurate method of determining the current excitation of wave guide 21, which may be indicated by a resistance measuring device connected to element 39 to indicate its resistance.

It will be seen that any element having the desired resistance-variable characteristics which will vary with temperature, or with the amount of current flowing therethrough, can be used as element 39 by connection in the inductive loop circuit.

One portion of loop 20 comprises end terminus 90 of inner conductor 19 of coaxial line 17. A second portion is a transverse section formed by a pin 79 slidably inserted within a slot or socket 78 in terminus 90, dimensioned so as to snugly accommodate pin 79 and to make electrical contact within inner conductor 19. Pin 79 is electrically joined to one end of resistance element 39 and is maintained in fixed relationship to inner conductor 19 by means of socket 78, and is locked therein by means of set screw 43.

Element 39 is usually contained within an adaptor or container 40 so as to give more accurate control over its temperature variation. Such a container usually comprises an insulating tubular body 41 having a terminal 82 which may be contained within an adapting socket 42 to provide a direct connection to a resistance measuring device, whose circuit is shown in Fig. 3.

Figure 5:
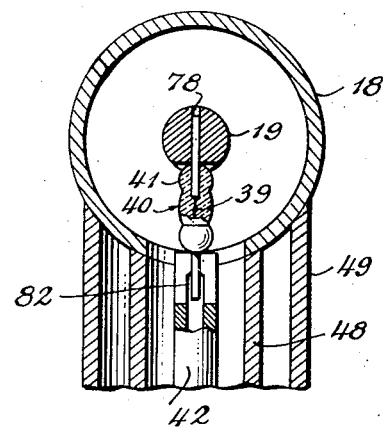
Fig. 5 shows a cross-section of the device of Fig. 4 taken along line 4—4 thereof.

The mode or manner of mounting resistive element 39 and its surrounding capsule container 40 within end section 90 of inner conductor 19 is also represented in cross-sectional view Fig. 5.

In order to provide a low impedance high frequency connection between terminal 82 and outer conductor 18, to complete loop 20, while still maintaining terminal 82 insulated from the outer conductor 18 in a direct current sense and to permit connection of element 39 to a resistance measuring device, as shown in Fig. 3, a radio frequency wave trap 47 is provided.

Wave trap 47 comprises a hollow cylindrical concentric line having both its inner conductor 48 and its outer conductor 49 connected at one end to the outer conductor 18 of coaxial line 17, and concentrically surrounding an extension 42' of socket 42. An apertured end plate 91 is fixed across the end of outer conductor 49, and carries a coupling nipple 54. A reduced diameter extension 53 of conductor 42' extends coaxially within nipple 54, and is centered therein and insulated therefrom by a bushing 51 formed of a material which attenuates the flow of radio frequency energy between extension 53 and nipple 54. A suitable material for this purpose is that known as "Polyiron". A set screw 55 maintains bushing 51 in position. The lower end of conductor 48 terminates just short of plate 91, so that conductor 48 is not directly connected either to conductor 49 or extension 42'. Conductors 48 and 49 are substantially one quarter wavelength long at the operating frequency of the apparatus, so that wave trap 47 comprises, in effect, a half wave line folded back on itself and short-circuited at one end (where conductors 48 and 49 meet conductor 18).

Conductors 48 and 49 form a short-circuited quarter wave transmission line which therefore presents a high impedance at its open end, between the lower ends of conductors 48 and 49. This high impedance is in series with the high impedance between nipple 54 and extension 53, caused by "Polyiron" bushing 51. Therefore a still higher impedance is presented between the lower ends of extension 42' and conductor 48. Conductor 48 and extension 42' form a second quarter-wave transmission line, which transforms this latter high impedance to a very low impedance between points 44 and 46 of conductor 18 and socket 42. Thus an effective short circuit appears between points 44 and 46, providing a return connection for the radio frequency currents in loop 20, while maintaining the lower end of element 39 insulated in a direct current sense. Outer conductor 18 can be therefore considered to be continuous; that is, little radio frequency leakage can occur.

As stated, adapting socket 42 is coupled to a resistance reading device through probe 53 contained within coupling nipple 54, as shown in Fig. 3. In this manner, the lower end of resistance element 39 may readily be connected to the reading device.

The other end of resistance element 39, connected directly to inner conductor 19, is connected to the reading device, in a direct current sense, by means of outer conductor 54' of the coupling nipple 54. This direct current circuit connecting the other end of element 39 and the reading device is accomplished by means of the inductive loop coupling or the quarter-wave stub support described hereinabove.

In Fig. 3 is shown a circuit by which the resistance-variable element 39 is fed with both radio frequency alternating current and direct current, and the variation in the magnitude in the alternating current is indicated by observing the variation in direct current required to maintain the total power dissipation of the conductor constant. Since, as has been stated, the resistance of the element depends upon its temperature, and the temperature in turn depends upon the power dissipation, the condition of constant total power dissipation is accurately maintained by measuring the resistance of the wire and maintaining it constant by varying the direct current supplied thereto.

In Fig. 3 a schematic diagram of such a bridge circuit is shown having four arms 56, 57, 58 and 59, with a diagonal indicating arm 60 and a current source 61 connected in the other diagonal arm. Arm 58 of the bridge includes the coaxial line coupling loop 20 which contains the current-variable resistance element 39. The diagonal arm 60 includes a galvanometer 64 and a sensitivity adjusting rheostat 65 connected in series between conjugate points 67 and 66 of the bridge.

The direct current source 61 is connected to the remaining pair of conjugate points 69 and 68 of the bridge in series with direct current power adjusting rheostats 70, 71 and a switch 72.

The resistors 73 and 74, forming arms 56 and 57, may be standard constant resistors and the resistor 62 is chosen to have a resistance value, which, when added to the resistance of the milliammeter 63, will produce a total resistance for the bridge arm 59 of the proper value to balance the bridge when the variable resistance element 39 has a predetermined resistance corresponding to the maximum input power to be measured, which is generally the maximum power which can be dissipated by element 39.

If ambient temperature compensation is desired, one of the resistors, such as the bridge arm 57, may take the form of a compensating resistor mounted in proximity to the element 39, so as to be subject to the same ambient temperature.

In the operation of the device to make a power measurement, the bridge of Fig. 3 is balanced before the microwave energy is supplied to coupling 25, by adjustment of the rheostats 70 and 71 until the current flowing through the element 39 is such as to produce a standard resistive value in the arm of the bridge and to cause a null indication on the galvanometer 64; as in any ordinary Wheatstone bridge measurement. The milliammeter 63 is then read to ascertain the power supplied to the standard resistance arm 58, which, at balance, equals that supplied to arm 59. Thereupon, the direct power supply to the bridge is reduced to prevent overload and burning out of the element 39, and microwave power is supplied to element 39 through the connection 25. The rheostats 70 and 71 are again adjusted until a balance is obtained as evidenced by a null indication of the galvanometer. The milliammeter 63 is again read, and the value of the microwave power input is then determined by the difference between the direct current power input to the element 39 before and after admission of the high frequency power.

By this means, therefore, the amount of radio frequency energy transmitted along the coaxial line 17 and flowing in the inner conductor 19 thereof through loop 18 is accurately determined, and provides an accurate means to monitor and/or measure the excitation to section 21 of the wave guide attenuator, independent of the amount of power derived at the output of the attenuator.

Figure 6:
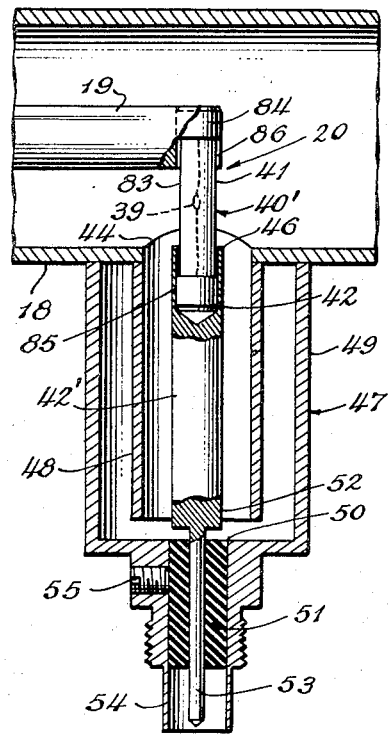
Fig. 6 shows an enlarged cross-section view of an alternative form of the monitor.

In Fig. 6 there is shown an alternative form of the device disclosed in Fig. 4, showing a resistance element container 40' having one end mounted within inner coaxial line 19 and transversely positioned athwart coaxial line 19.

Container 40' comprises an insulating tubular body 83 carrying a pair of ferrules 84, closing the ends of the tube 83, which are electrically connected to the ends of the resistance element 39. For supporting the lower end of the container, a socket 85 is provided, and for rigidly containing the upper end of the container within inner conductor 19 a slot 86 is provided therein.

Containers 40 and 40', although shown as being free of any encircling structure in the drawings, can, however, be embedded or immersed within the inner conductor 19 or its extension, so as to afford better electrical contact.

The same radio frequency wave trap arrangement 47 is used in Fig. 6 as in the prior figures.

Although the invention as herein described has been discussed in relation to wave guide attenuators below cut-off, it is not intended that the scope thereof be limited thereto, but that it be merely illustrative of the manner of operation thereof. The invention herein described may also be used with several other forms of associated apparatus, as for example, by incorporating the monitoring variable resistance element in a coupling loop exciting other apparatus, such as ordinary wave guides above cut-off, cavity resonators, radiators, etc.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Ultra-high-frequency apparatus comprising a coaxial line having an inner and an outer conductor for conveying electromagnetic energy, a continuation of said outer conductor forming a below cut-off wave guide section at the operating frequency and being adapted for connection to a utilization device, calibrated means for varying the attenuation in said wave guide section, an impedance element having one end connected to the end of said inner conductor adjacent said below cut-off wave guide section, said impedance element extending radially between said inner and outer conductors and being characterized by appreciable change of impedance as a function of current flow therethrough, an output lead connected to the other end of said impedance element and extending through an opening in said outer conductor, and a wave trap surrounding said opening, whereby said calibrated attenuation means and said impedance element afford means for measuring the power conveyed by the apparatus over a wide range of output power variation.

2. An ultra-high-frequency attenuator comprising a tubular conductor adapted for connection to a utilization device, a dielectric member within said tubular conductor for coupling the tubular conductor to said utilization device, calibrated means for moving said dielectric member longitudinally along said tubular conductor, a conductive rod coaxial with and extending within a portion of the other end of said tubular conductor, the portion of said tubular conductor between the end of said conductive rod and said dielectric member being a below cut-off wave guide at the operating frequency, an impedance element having one end connected to the end of said conductive rod adjacent said below cut-off wave guide and extending radially between said conductive rod and said tubular conductor, said impedance element being characterized by appreciable change of impedance as a function of current flow therethrough, an output lead connected to the other end of said impedance element and extending through an opening to said tubular conductor, and a wave trap surrounding said opening.

3. In combination, a coaxial line having an inner and outer conductor for conveying electromagnetic energy, a continuation of said outer conductor forming a below cut-off wave guide section at the operating frequency and being adapted for connection to a utilization device, a dielectric member coupling said wave guide to said utilization device, calibrated means for moving said dielectric member longitudinally along said wave guide, an impedance element having one end connected to the end of said inner conductor which is adjacent said below cut-off wave guide section, said impedance element extending radially between said inner and outer conductors and being characterized by appreciable change of impedance as a function of current flow therethrough, an output lead connected to the other end of said impedance element and extending through an opening in said outer conductor for connecting said impedance element to an impedance measuring device, a wave trap surrounding said opening, and means for connecting the inner conductor of said coaxial line to said impedance measuring device.

THEODORE MORENO.

REFERENCES CITED

The following references are of record in the file of this patent:

UNITED STATES PATENTS

| Number | Name | Date |
|---|---|---|
| 2,207,845 | Wolff | July 16, 1940 |
| 2,284,379 | Dow | May 26, 1942 |
| 2,293,839 | Linder | Aug. 25, 1942 |
| 2,296,678 | Linder | Sept. 22, 1942 |
| 2,317,503 | Usselman | Apr. 27, 1943 |
| 2,332,952 | Tischer | Oct. 26, 1943 |
| 2,335,486 | Clark | Nov. 30, 1943 |
| 2,399,481 | George | Apr. 30, 1946 |
| 2,399,674 | Harrison | May 7, 1946 |
| 2,402,663 | Ohl | June 25, 1946 |
| 2,405,814 | Brannin | Aug. 13, 1946 |
| 2,409,640 | Moles | Oct. 22, 1946 |
| 2,416,694 | Howard | Mar. 4, 1947 |